United States Patent
Kirsch

(10) Patent No.: US 11,102,470 B2
(45) Date of Patent: *Aug. 24, 2021

(54) APPARATUS AND METHOD FOR PROVIDING A GRAPHIC REPRESENTATION OR GRAPHIC REPRESENTATION SEQUENCE FOR DETECTION BY A DETECTOR

(71) Applicant: PEPPERL+FUCHS SE, Mannheim (DE)

(72) Inventor: Martin Kirsch, Heddesheim (DE)

(73) Assignee: PEPPERL+FUCHS SE, Mannheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/567,915

(22) PCT Filed: Sep. 15, 2015

(86) PCT No.: PCT/EP2015/071091
§ 371 (c)(1),
(2) Date: Oct. 19, 2017

(87) PCT Pub. No.: WO2017/045706
PCT Pub. Date: Mar. 23, 2017

(65) Prior Publication Data
US 2018/0115773 A1  Apr. 26, 2018

(51) Int. Cl.
*H04N 17/00* (2006.01)
*G01D 5/347* (2006.01)
(Continued)

(52) U.S. Cl.
CPC ....... *H04N 17/002* (2013.01); *G01D 5/34707* (2013.01); *G01D 5/34746* (2013.01);
(Continued)

(58) Field of Classification Search
CPC ............ H04N 17/002; H04N 5/23212; H04N 5/2356; G01D 5/34707; G01D 5/34746;
(Continued)

(56) References Cited

U.S. PATENT DOCUMENTS 4,818,886 A   4/1989   Drucker
5,966,208 A   10/1999  Samuelson

FOREIGN PATENT DOCUMENTS

DE   29520980 U1   8/1996

OTHER PUBLICATIONS

PepperL+Fuchs, Data Matrix Positioning System, Apr. 13, 2010, Retreived from < https://www.pepperl-fuchs.com/global/en/classid_2614.htm?view=productgroupoverview> on Apr. 15, 2019 (Year: 2010).*

(Continued)

*Primary Examiner* — Antoinette T Spinks
(74) *Attorney, Agent, or Firm* — Alston & Bird LLP

(57) ABSTRACT

For providing an apparatus and method for providing a graphic representation (1) or a graphic representation sequence for detection by a detector (3) which provide a simple and effective variation of a graphic representation (1) or a graphic representation sequence for detection by the detector (3) an apparatus is claimed, comprising: a sequence of graphic representations (1) along an optical axis (2), an optical device (4) for focusing on at least one of the graphic representations (1), so that the at least one of the graphic representations (1) is visible by a detector (3) preferably with a predefinable sharpness, a control unit (5) for defining and providing a focusing sequence on the at least one of the graphic representations (1) by the optical device (4) for providing a change of visibility of the graphic representations (1) or of a part of the graphic representations (1) by the (Continued)

detector (3) in order to allow for the verification of the correct functioning of the detector.

14 Claims, 2 Drawing Sheets

(51) Int. Cl.
    *H04N 5/232*      (2006.01)
    *H04N 5/235*      (2006.01)
    *G01D 18/00*      (2006.01)
    *G02B 7/10*      (2021.01)
    *G02B 7/38*      (2021.01)
    *G06K 19/06*      (2006.01)

(52) U.S. Cl.
    CPC ......... *G01D 5/34776* (2013.01); *G01D 18/00* (2013.01); *G02B 7/102* (2013.01); *H04N 5/2356* (2013.01); *H04N 5/23212* (2013.01); *G02B 7/38* (2013.01); *G06K 19/06112* (2013.01)

(58) Field of Classification Search
    CPC .... G01D 5/34776; G01D 18/00; G02B 7/102; G02B 7/38; G06K 19/06112
    See application file for complete search history.

(56) References Cited

OTHER PUBLICATIONS

International Searching Authority, International Search Report and Written Opinion for International Application No. PCT/EP2015/071091, dated May 24, 2015, 12 pages, European Patent Office, Netherlands.

PepperL+Fuchs GmbH, "Fabrikautomation Fabrikautomation Data Matrix Positioniersystem PCV Data Matrix Positioniersystem PCV Zuverlassige Positionserfassung Durch 2D-Codeband Und Moderne Kamera-Technologie" (English: Data Matrix Positioning System PCV, 2-D Code Band and the Latest Camera Technology Ensure Reliable Position Detection), Apr. 13, 2010, pp. 1-6, Mannheim, Germany, Retrieved from <http://files.pepperl-fuchs.com/selectorfiles/navi/productInfo/doct/tdoct2069ger.pdf> on May 12, 2016.

Spagnolo, Giuseppe Schirripa, et al., "New 2D Barcode Solution Based on Computer Generated Holograms: Holographic Barcode", Proceedings of the $5^{th}$ International Symposium on Communications, Control and Signal Processing (ISCCSP), May 2-4, 2012, Italy, pp. 1-5, IEEE.

\* cited by examiner

APPARATUS AND METHOD FOR PROVIDING A GRAPHIC REPRESENTATION OR GRAPHIC REPRESENTATION SEQUENCE FOR DETECTION BY A DETECTOR

CROSS REFERENCE TO RELATED APPLICATIONS

This application is a National Stage Application, filed under 35 U.S.C. 371, of International Application No. PCT/EP2015/071091, filed Sep. 15, 2015; the contents of which as are hereby incorporated by reference in their entirety.

BACKGROUND

Related Field

The present invention relates to an apparatus and a method for providing a graphic representation or graphic representation sequence for detection by a detector.

Description of Related Art

Various apparatuses and methods for providing a graphic representation or graphic representation sequence for detection by a detector are known from prior art. For example, in the field of image processing, it is known to provide a graphic representation to be detected by a detector for analyzing purposes.

For achieving reliable analysis results it is very important that the detector works correctly. For verifying correct function of the detector a definable graphic representation or graphic representation sequence can be provided and a detection result can be compared with the provided representation or representation sequence. If no coincidence or relation between the provided representation or representation sequence and the data detected by the detector can be determined, a malfunction of the detector can be the reason for the missing coincidence or relationship. In this case, the detector can be replaced by a correctly working detector, for example.

Thus, it is an object of the present invention to provide an apparatus and method for providing a graphic representation or graphic representation sequence for detection by a detector, which provide a simple and effective variation of a graphic representation or a graphic representation sequence for detection by the detector.

BRIEF SUMMARY

In accordance with the invention, the aforementioned object is accomplished by an apparatus comprising the features of claim 1. The apparatus comprises a sequence of graphic representations along an optical axis, an optical device for focusing on at least one of the graphic representations, so that the at least one of the graphic representations is visible by a detector preferably with a predefinable sharpness, a control unit for defining and providing a focusing sequence on the at least one of the graphic representations by the optical device for providing a change of visibility of the graphic representations or of a part of the graphic representations by the detector.

Further, the aforementioned object is accomplished by a method according to claim 15, wherein a sequence of graphic representations is provided along an optical axis, wherein an optical device focuses on at least one of the graphic representations, so that the at least one of the graphic representation is visible by a detector preferably with a predefinable sharpness, and wherein a control unit defines and provides a focusing sequence on the at least one of the graphic representations by the optical device for providing a change of visibility of the graphic representations or of a part of the graphic representations by the detector.

According to the invention it has been recognized that a variation of a focus adjustment on at least one of the graphic representations can provide the basis for a simple and effective variation of a graphic representation or a graphic representation sequence. Further, it has been recognized that a suitable arrangement of various graphic representations is particularly useful for overcoming the above object. Concretely, a sequence of graphic representations along an optical axis is provided, wherein an optical device can focus on at least one of the graphic representations, so that the at least one of the graphic representations is visible by the detector preferably with a predefinable sharpness wherein such a level of sharpness can be defined and monitored by a suitable optical equipment. The focus can be adjusted so that only one graphic representation of the sequence of graphic representations is visible by the detector. A variation of provided graphic representations is realized by a control unit which defines and provides a focusing sequence on the at least one of the graphic representations. The control unit can control the optical device in a suitable way, so that a change of visibility of the graphic representations or of a part of the graphic representations by the detector is possible. In a very simple case, a graphic representation is visible by suitable focusing or is not visible due to non-focusing or defocusing. This is a very simple provision of a change of visibility.

Thus, the inventive apparatus and method provide a simple and effective variation of a graphic representation or a graphic representation sequence for detection by the detector by simply varying the focus on the sequence of graphic representations.

Within a simple embodiment of the present invention the focusing sequence can comprise a switch of focus from at least one graphic representation to another graphic representation or from at least one part of a graphic representation to a part of another graphic representation. In this very simple case a switch between two graphic representations can be performed by varying the focus between these two graphic representations. However, the focusing sequence can comprise a complex switching sequence, if more than two graphic representations are provided along the optical axis. A suitable focusing sequence can follow a predefinable time schedule with predefined focus durations on selected graphic representations and/or defined time delays prior to a switch of focus to another graphic representation.

For realizing a correctly detectable arrangement of graphic representations the graphic representations can be arranged in parallel planes behind each other along the optical axis. As a result of this orderly arrangement the optical device can simply focus on each of said graphic representations without further special optical equipment considering an inclination of the representations.

For providing a very simple apparatus the graphic representations can be arranged with a predefinable distance from each other. Such an arrangement can be provided by one or more spacers for realizing a stable arrangement of the graphic representations. Preferably, the distances between the graphic representations can be equal so that an equidistant arrangement is realized.

Suitable graphic representations can be realized in many different ways. For example, the graphic representations can comprise graphically designed, preferably printed, foils. Such foils can simply be arranged behind each other for providing a suitable sequence of graphic representations along the optical axis.

Within another preferred embodiment the graphic representations can comprise a code, code sequence, binary code, bar code or data matrix code or a combination or a superposition thereof. Depending on the individual application situation a suitable code or combination or superposition of codes can be used.

Within a further preferred embodiment the sequence of graphic representations can form a hologram. By suitable focusing by the optical device different optical informations can be obtained from such a hologram depending on the individual focusing adjustment.

For simply providing a focusing sequence on the at least one of the graphic representations the optical device can comprise an adjusting functionality or means for varying the focus. A quick variation of the focus adjustment can be possible with such a functionality or means.

For realizing a compact apparatus and saving mounting space the optical device can be attached to or integrated in the detector which can be a part of the apparatus. Thus, a combined module with the detector and the optical device can be provided.

Within a further preferred embodiment the optical device can comprise a fixed-focus lens. Such a type of lens has usually a simple construction which saves costs. In connection with such a fixed-focus lens the graphic representations can be assigned or attached to a movable device for moving the graphic representations along the optical axis. By moving the graphic representations at least one graphic representation can be moved to a suitable focus point of the fixed-focus lens, so that a sharp image can be obtained. In this case, a focusing sequence is obtained by movement of the graphic representations along the optical axis, so that different graphic representations can be moved in a focus position regarding the fixed-focus lens.

Within another preferred embodiment the detector can form a part of the apparatus and can comprise a sensor being movable along the optical axis. In this case, a fixed-focus lens can be used and the graphic representations can be arranged along the optical axis without movement. The moving part for providing a focusing sequence is the movable detector or sensor.

For providing an effective evaluation of data detected by the detector the apparatus can comprise evaluating means for verifying a coincidence or relationship of the provided graphic representation or graphic representation sequence with corresponding data detected by the detector. Thus, functioning of the detector can be verified by detection and evaluation of the image of a graphic representation or a graphic representation sequence provided by the focusing sequence of the control unit. If such an image within the detector is frozen or if a software has hung up or has a time shift/delay, no corresponding data will be detected by the detector and the detector can be qualified as malfunctioning or not functioning. Corresponding maintenance activities could be initiated in such a situation.

Within a preferred application situation the apparatus can be a part of a system for reliably determining the position of an object regarding a relative movement between the object and a path. Such a system comprises a detector attached to or integrated in the object and at least one marker being located along the path, wherein the at least one marker is detected by the detector within its spatial detection range for determining the position of the object relative to the marker and wherein the apparatus provides the graphic representation or graphic representation sequence for detection by said detector. By such an arrangement a simple verification of correct functioning of the detector can be provided by the apparatus for providing a graphic representation or graphic representation sequence for detection by the detector.

BRIEF DESCRIPTION OF THE FIGURES

There are several ways how to design and further develop the teaching of the present invention in an advantageous way. To this end it is to be referred to the patent claims subordinate to patent claim 1 on the one hand and to the following explanation of preferred embodiments of the invention, by way of example, illustrated by the figures on the other hand. In connection with the explanation of the preferred embodiments of the invention by the aid of the figures, generally preferred embodiments and further developments of the teaching will be explained. In the drawing

DETAILED DESCRIPTION OF VARIOUS EMBODIMENTS

Figure 1:
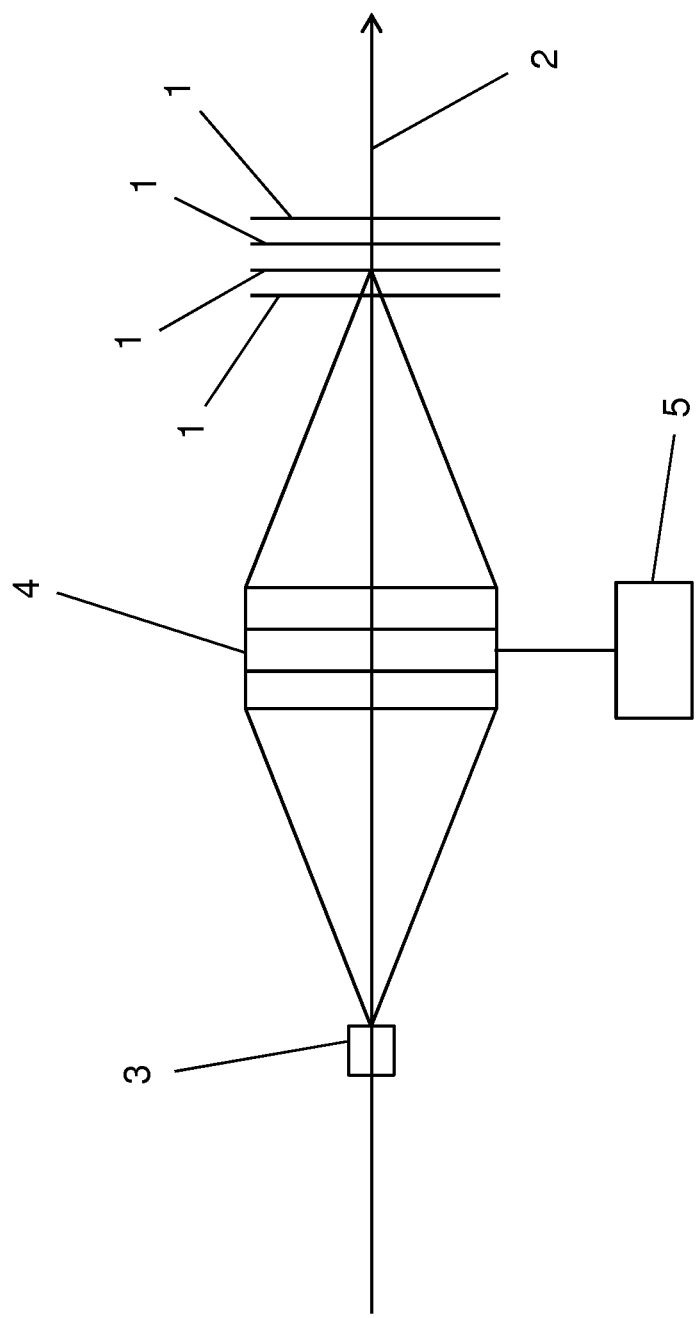
FIG. 1 is a schematic view of an apparatus for providing a graphic representation or graphic representation sequence according to an embodiment of the present invention and FIG. 2 is a schematic view of a system for reliably determining the position of an object which can be used together with an apparatus according to FIG. 1.

FIG. 1 shows an embodiment of an apparatus for providing a sequence of graphic representations 1 which are arranged along an optical axis 2 for detection by a detector 3. An optical device 4 is provided for focusing on at least one of the graphic representations 1, so that the at least one of the graphic representations 1 is visible by the detector 3 with a predefinable sharpness. A control unit 5 defines and provides a focusing sequence on the graphic representations 1 by the optical device 4 for providing a change of visibility of the graphic representations 1 or of a part of the graphic representations 1 by the detector 3. The detector 3 shown within FIG. 1 is a digital camera.

The control unit 5 is designed for providing a focusing sequence between the graphic representations 1 by suitable adjustment of the optical device 4, wherein the embodiment according to FIG. 1 provides four graphic representations 1.

The graphic representations 1 have a planar structure and are arranged in parallel planes behind each other along the optical axis 2. The graphic representations 1 are arranged with equal distances between the graphic representations 1. The graphic representations 1 comprise graphically designed foils or a code, code sequence, binary code, bar code or data matrix code or a combination or a superposition thereof. Within the embodiment of FIG. 1 the optical device 4 is adjusted for visibility of the second graphic representation 1 of said four graphic representations 1.

The optical device 4 comprises an adjusting functionality or means for simply adjusting a focus for a predefinable focusing sequence. Such a focusing sequence can comprise switching of focus between said four graphic representations 1 within FIG. 1. Various planes of sharpness are considered within such a focusing sequence. Graphic representations 1 can be provided in a stacked manner. Different data can be detected from differently adjusted planes of sharpness.

Figure 2:
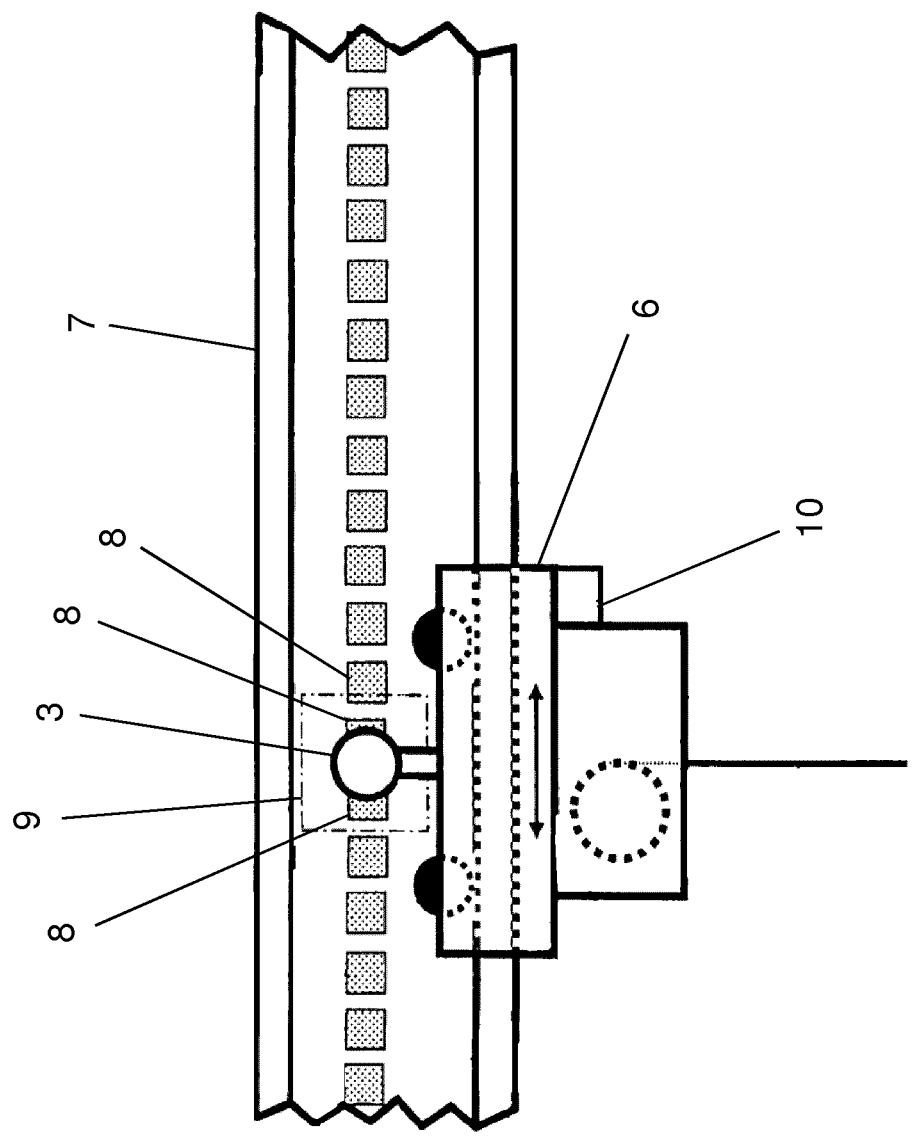

FIG. 2 shows a schematic view of an embodiment of a system for reliably determining the position of an object 6 regarding a relative movement between the object 6 and a path 7 for use with the apparatus according to the invention. The system comprises a detector 3 attached to the object 6, wherein the detector 3 corresponds to the detector 3 of FIG. 1.

A plurality of markers 8 is located along the path 7. The markers 8 are realized by data matrix codes positioned along the path 7. The markers 8 are detected by the detector 3 within its spatial detection range 9 for determining the position of the object 6 relative to the markers 8. For verifying the correct function of the detector 3 the apparatus provides a graphic representation 1 for detection by the detector 3. The graphic representation 1 or graphic representations 1 can be identical with the markers 8. In other words, the markers 8 can be realized by a sequence of graphic representations 1 along an optical axis 2 which is arranged vertically with regard to the drawing plane of FIG. 2. For verifying a coincidence or relationship of the provided representation 1 or a graphic representations 1 with corresponding data detected by the detector 3 corresponding evaluating means 10 are assigned to the object 6.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS

1 graphic representation
2 optical axis
3 detector
4 optical device
5 control unit
6 object
7 path
8 marker
9 detection range
10 evaluating means

The invention claimed is:

1. A system for reliably determining the position of an object (6) regarding a relative movement between the object (6) and a path (7), the system comprising:
   a path (7) having a path axis;
   a plurality of markers (8) located on the path (7) and extending along the path axis;
   an object (6);
   a detector (3) either attached to or integrated in the object (6), the detector (3) comprising a sensor; and
   an apparatus comprising:
      a sequence of graphic representations (1) arranged along an optical axis (2), wherein the graphic representations (1) are identical with the markers (8);
      an optical device (4) configured for focusing on at least one of the graphic representations (1), so that the at least one of the graphic representations (1) is visible by the detector (3);
      a control unit (5) configured for defining and providing a focusing sequence on the at least one of the graphic representations (1) by the optical device (4) so as to provide a change of visibility of the graphic representations (1) or of a part of the graphic representations (1) by the detector (3); and
      evaluating means (10) configured for verifying a coincidence or relationship of the provided graphic representation (1) or graphic representation sequence with corresponding data detected by the detector (3),
   wherein:
      each of the plurality of markers (8) are detected by the detector (3) within a spatial detection range (9) of the detector (3), so as to determine the position of the object (6) relative to the detected marker (8);
      the apparatus provides the graphic representation (1) or graphic representation sequence for detection by said detector (3);
      absence of the coincidence or relationship is indicative of a malfunctioning or a lack of functioning of the detector (3), the malfunctioning or the lack of functioning of the detector (3) involving a frozen image or a time delay or shift between images; and
      focusing sequence comprises a switch of focus from either at least one graphic representation (1) to another graphic representation (1) or from at least one part of a graphic representation (1) to a part of another graphic representation (1).

2. The system according to claim 1, wherein the graphic representations (1) are arranged in parallel planes behind each other along the optical axis (2).

3. The system according to claim 1, wherein the graphic representations (1) are arranged with a predefined distance from each other.

4. Apparatus according to claim 3, wherein the distances between the graphic representations (1) are equal.

5. The system according to claim 3, wherein the predefined distance is defined by one or more spacers.

6. The system according to claim 3, wherein:
   the graphic representations (1) comprise graphically designed foils; and
   the foils are printed foils.

7. The system according to claim 1, either:
   the graphic representations (1) comprise graphically designed foils; or
   the graphic representations (1) comprise a code, code sequence, binary code, bar code or data matrix code or a combination or superposition thereof.

8. The system according to claim 1, wherein the sequence of graphic representations (1) forms a hologram.

9. The system according to claim 1, wherein the optical device (4) comprises means for varying the focus.

10. The system according to claim 1, wherein:
    the optical device (4) is either attached to or integrated in the detector (3); and
    the detector (2) forms part of the apparatus.

11. The system according to claim 1, wherein the optical device (4) comprises a fixed-focus lens.

12. The system according to claim 1, wherein the optical device (4) is focused with a pre-definable sharpness.

13. Method for providing a graphic representation (1) or graphic representation sequence for detection by a detector (3), said method being performed by the system according to claim 1 and comprising the steps of:
    providing a sequence of graphic representations (1) is along an optical axis (2);
    focusing the optical device (4) on at least one of the graphic representations (1), so that the at least one of the graphic representations (1) is visible by the detector (3);

defining and providing, via the control unit (5), a focusing sequence on the at least one of the graphic representations (1) by the optical device (4) for providing a change of visibility of the graphic representations (1) or of a part of the graphic representations (1) by the detector (3);

detecting, via the detector (3) and within the spatial detection range (9) of the detector, the at least one marker for determining the position of the object (6) relative to the marker (8); and verifying, via the evaluating means, a coincidence or relationship of the provided graphic representation (1) or graphic representation sequence with corresponding data detected by the detector (3), absence of the coincidence or relationship identifying malfunctioning of the detector (3), the malfunctioning or the lack of functioning of the detector (3) involving a frozen image or a time delay or shift between images.

14. Method according to claim 13, wherein the focusing, via the optical device (4), is provided with a pre-definable sharpness.

\* \* \* \* \*